(12) United States Patent
Inoue et al.

(10) Patent No.: US 6,676,296 B2
(45) Date of Patent: Jan. 13, 2004

(54) RADIAL BEARING AND TRANSMISSION USING THE SAME

(75) Inventors: Tomoaki Inoue, Mito (JP); Kohji Aizawa, Hitachi (JP); Masaaki Nakano, Hitachi (JP); Masanori Katayama, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/939,667

(22) Filed: Aug. 28, 2001

(65) Prior Publication Data

US 2002/0131657 A1 Sep. 19, 2002

(30) Foreign Application Priority Data

Mar. 16, 2001 (JP) .......................... 2001-075240

(51) Int. Cl.⁷ .............................................. F16C 33/04
(52) U.S. Cl. ...................... 384/276; 384/282; 384/294; 384/299
(58) Field of Search .................. 384/294, 296, 384/297, 273

(56) References Cited

U.S. PATENT DOCUMENTS

| | | | | |
|---|---|---|---|---|
| 4,241,960 A | * | 12/1980 | Hentschel | ................... 384/299 |
| 4,294,494 A | * | 10/1981 | Yoshioka et al. | ............. 308/76 |
| 4,707,149 A | * | 11/1987 | Hahle | ......................... 384/294 |
| 5,549,394 A | * | 8/1996 | Nowak et al. | ............. 384/282 |
| 6,015,236 A | * | 1/2000 | Niegel et al. | ................ 384/276 |
| 6,273,612 B1 | * | 8/2001 | Ono et al. | .................... 384/276 |

FOREIGN PATENT DOCUMENTS

| JP | 2000-081031 | * | 3/2000 |
|---|---|---|---|
| JP | 2000-249147 | * | 9/2000 |

* cited by examiner

Primary Examiner—Matthew C. Graham
(74) Attorney, Agent, or Firm—Antonelli, Terry, Stout & Kraus, LLP

(57) ABSTRACT

The present invention relates to a bearing used in a transmission. The radial bearing for supporting a rotating shaft of the transmission has a substantial elliptical-cylinder-shaped inner circumferential surface. At least two lubricating resin members are provided on the inner circumferential surface so that the members are extending in the axial direction and symmetric with respect to the central axis of the bearing. The rigidity of the bearing is increased as increasing the rotation speed of the shaft.

4 Claims, 9 Drawing Sheets

GEAR SHAFT          PINION SHAFT

GEAR SHAFT          PINION SHAFT

GEAR SHAFT            PINION SHAFT

RADIAL BEARING AND TRANSMISSION USING THE SAME

BACKGROUND OF THE INVENTION

The present invention relates to a radial bearing for journaling a rotating body and a transmission using the radial bearing, and more particularly to a radial bearing suitable for journaling a rotating body subjected to a fluctuating load and a transmission using the radial bearing.

Tin-based white metal has been commonly used as a sliding material of a radial bearing for bearing a rotating body. However, recently, engineering plastic having low friction, high heat resistance and high wear resistance properties has received attention as the sliding material, so that a high polymer composite resin material which is mainly made of thermoplastic polytetrafluoroethylene (tetrafluoroethylene resin), polyetheretherketone (PEEK) or polyimide, and added with glass fiber, carbon fiber, graphite, molybdenum disulfide or the like to improve the mechanical strength, sliding property, wear resistance property and the like becomes employed as a bearing sliding material especially for large rotating apparatuses.

Examples of a radial bearing using such resin material are described in JP-A-2000-249147 and JP-A-2000-81031. JP-A-2000-249147 discloses a radial bearing comprising a plurality of bearing pads and a metal filter interposed between a back metal, which is a reinforcing member constituting the bearing pads, and a resin sliding member. The back metal fixed with the metal filter is heated to a temperature equal to or larger than the melting point of the resin sliding member, and thereafter laminated with the resin sliding member thereon.

Further, in JP-A-2000-81031, a groove portion is provided on an inner surface of a sleeve bearing made of resin in order to reduce mechanical noise due to vibration of a shaft and the bearing and improve durability by a simple structure, without significantly reducing the clearance between the shaft and the bearing. By storing grease applied during the assembly in the groove portion, the grease can be supplied to the clearance portion for a long time to reduce noise and improve durability.

Although the radial bearing according to the above-described JP-A-2000-249147 specification has the advantage of improving adhesion between the resin sliding member and the back metal to prevent damage on a sliding surface and separation of the resin sliding member, the radial bearing structure is a tilting pad type bearing structure and thus, there is a need for further improvement with respect to load capability, while being superior in vibration property. That is, it is required that the radial bearing can stably support the rotating body even when the radial bearing is subjected to a large load exerted in a transmission, for example.

Further, the radial bearing according to JP-A-2000-81031 specification is a grease lubricated bearing for bearing a light load, unlike a oil lubricated bearing usable for a long period. Therefore, although the groove is formed, it is intended to store the grease while making little contribution to improvement of vibration property of the rotating body. Additionally, in the specification, it is not studied to support a large load by the radial bearing.

BRIEF SUMMARY OF THE INVENTION

In view of the above-described prior arts, it is an object of the present invention to realize a radial bearing which can stably support a rotating body even under a light load and can prevent burnout of the bearing even under a high load, and a transmission using the radial bearing.

In order to achieve the above-described object, according to a first aspect of the invention, there is provided a radial bearing for supporting a rotating shaft, which has a substantial elliptical-cylinder-shaped inner circumferential surface and comprises at least two protruding portions extending in the axial direction on the inner circumferential surface of the bearing, wherein the protruding portions are symmetric with respect to the central axis of the bearing to stabilize the shafting.

In the bearing, it is preferable that the protruding portions are located in correspondence with a high specific load exerting area on the inner circumferential surface of the bearing to improve the load capacity. The protruding portions may be located in an area between the major axis of the ellipse, and 110 or 120 degrees therefrom in a certain circumferential direction on the inner circumferential surface. Additionally, it is preferable that the protruding portions are lubricating resin members provided on the inner circumferential surface of the bearing. The resin members may be made of one selected from the group of polyetheretherketone (PEEK), tetrafluoro-ethylene resin, and polyimide resin.

Further, it is preferable that the bearing can be divided into two parts substantially along the major axis of the ellipse. Still further, it is preferable that an oil groove is provided on an inner surface of the resin members in the vicinity of the major axis of the ellipse so as to extend in the axial direction of the bearing except for both axial ends of the bearing. Additionally, in the case of the two-part bearing, it may be built up so that the inner circumferential surface of the bearing has a symmetric shape with respect to the central axis of the rotating shaft.

In order to achieve the above-described object, according to a second aspect of the invention, there is provided a transmission comprising a gear shaft provided with a gear, a pinion shaft provided with a pinion engaging with the gear, and a plurality of bearings for supporting the gear shaft and the pinion shaft, wherein at least one of the plurality of bearings is the radial bearing according to the first aspect of the invention.

DETAILED DESCRIPTION OF THE INVENTION

Conventionally, an elliptic bearing is generally used as a radial bearing for supporting a rotating body, such as a reducer, showing great fluctuation in load for the purpose of preventing self-excited vibration. However, in the rotating body, bearing load may be out of a design value due to setting fault of alignment or deviation with time, so that the stability of shafting is compromised and vibration such as oil whip or oil whirl occurs. The oil whip results from decrease of an eccentric amount of the shaft associated with reduction of the bearing load.

That is, if average specific load exerted on the bearing is low and the eccentric amount of the shaft is small, rigidity of an oil film of the bearing is reduced and a coupled term in the oil film rigidity becomes dominant, which results in growth of instability. A general method for preventing the self-excited vibration is to use a tilting pad bearing which can decrease the coupled term to a negligible degree. However, the tilting pad bearing has low load capability.

Accordingly, various methods are proposed for improving the load capability, however, although each of these methods provides superior stability under normal load, they cause the self-excited vibration when the bearing load is significantly reduced. Especially in a transmission, light load only caused by shaft weights acts on the bearing until a rated rotation is achieved, and then the load direction changes once the rated rotation is achieved. Additionally, high load is exerted under rated loading, for example, so that load condition of the bearing variously changes. In order to achieve stability at low load, it is proposed to provide oil grooves in a loaded surface to reduce the load capability, however, it may cause burnout of the bearing due to decrease of an oil film thickness when the bearing load is increased in the rated loading state or other states.

Figure 1:
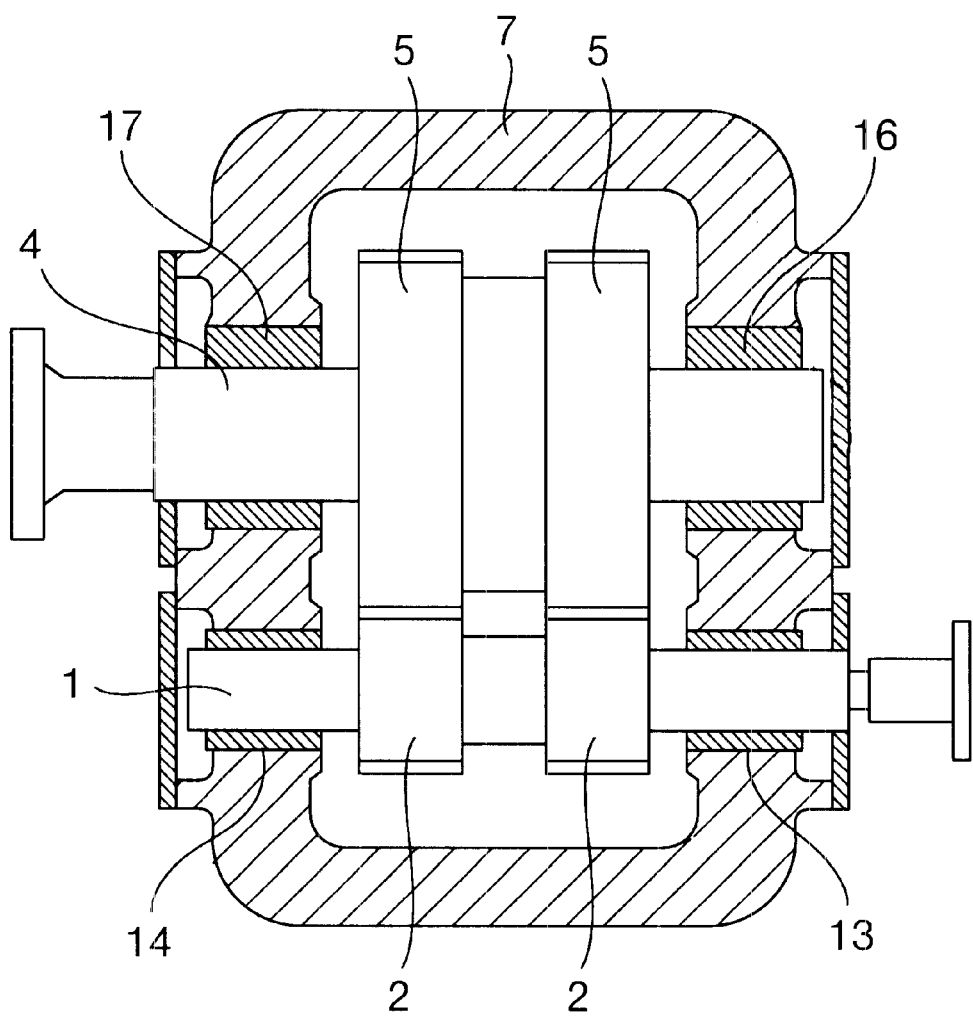
FIG. 1 is a longitudinal sectional view of an embodiment of a transmission according to the present invention.

Therefore, in the present invention, a generating range of the oil film pressure under light load is restricted to prevent reduction of the eccentricity. In the following, concrete examples will be described using the drawings. FIG. 1 shows a longitudinal sectional view of an embodiment of a reducer used in a gas turbine driven power plant, according to the present invention.

A pair of helical pinions 2 is mounted in the center of a pinion shaft 1 which is an input shaft. Both ends of the pinion shaft 1 are supported by sliding bearings 13, 14. Additionally, helical gears 5, 5 opposite to and engaging with the helical pinions 2, 2 are mounted in the center of a gear shaft 4 which is an output shaft. Both ends of the gear shaft 4 are also supported by sliding bearings 16, 17. The radial sliding bearings 13, 14, 16, and 17 are retained in a casing 7.

Figure 2:
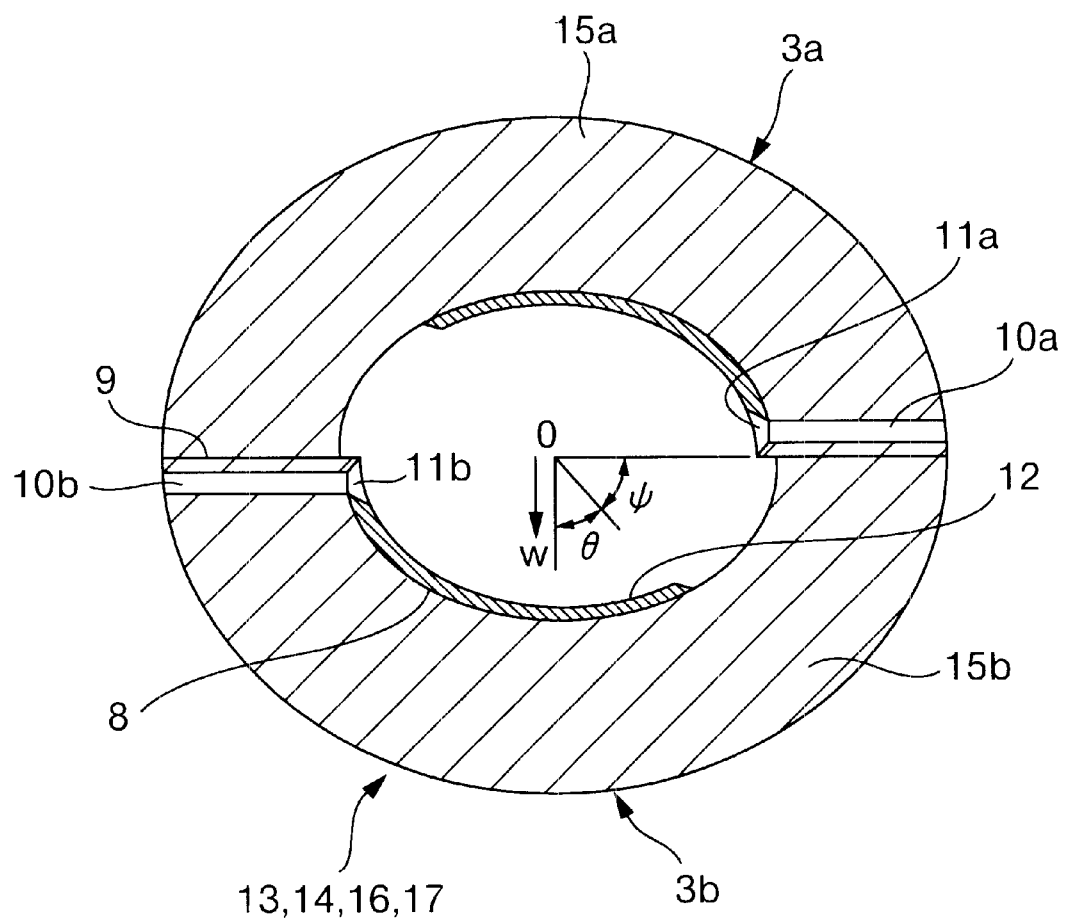
FIG. 2 is a transverse sectional view of a radial bearing used in the transmission shown in FIG. 1.

FIG. 2 shows a transverse sectional view of an example of the radial sliding bearings for supporting the pinion shaft 1 or the gear shaft 4. The radial sliding bearing includes an upper half bearing 3a and a lower half bearing 3b obtained by dividing a cylindrical bearing material made of metal into two pieces. The upper half bearing 3a and the lower half bearing 3b are fastened at divided ends 9 by a bolt (not shown). When the upper half bearing 3a and the lower half bearing 3b are fastened together by the bolt, a shape of an inner circumferential surface formed by the bearing materials 15a, 15b is an ellipse having a major axis in a direction of the divided ends 9 and a minor axis in a direction orthogonal to the direction of the divided ends 9. Incidentally, an eccentricity of the ellipse is defined in accordance with loading condition of the bearing or other factors, and in the present invention, a shape having its eccentricity of 0 is also referred to as an ellipse.

On the elliptical shaped inner circumferential surface of the bearing materials 15a, 15b, resin materials 8 are applied or lined in the circumferential direction within predetermined angles. Preferably, the resin material 8 is polyetheretherketone resin (PEEK), tetrafluoroethylene resin (PTFE), or polyimide resin in view of heat resistance and sliding properties. In particular, the PEEK resin has a heat resistance temperature higher than that of white metals which are conventionally and commonly used, by approximately 100 degrees Celsius, so that it is suitable for a rotating body generating a high surface pressure, such as a transmission.

Figure 3:
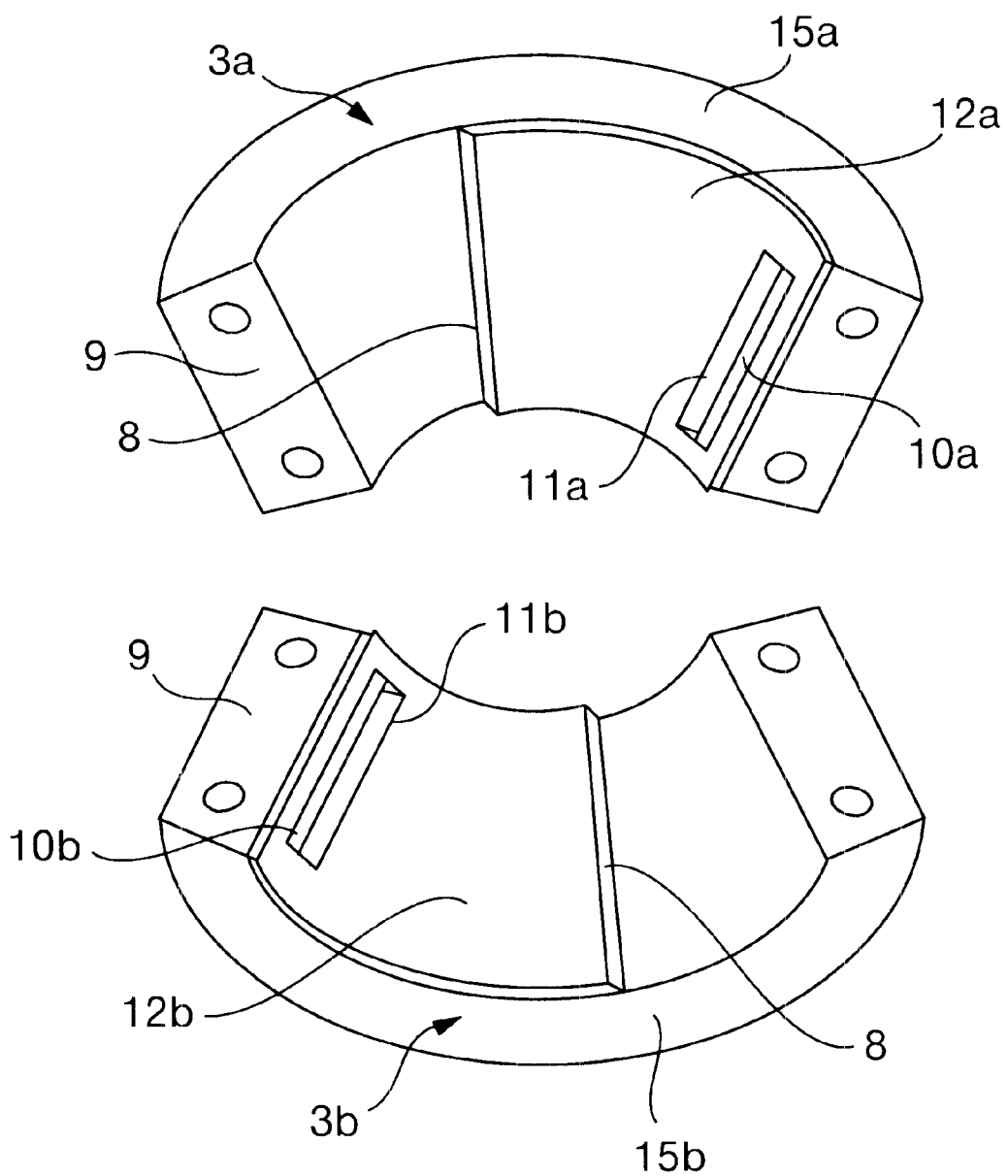
FIG. 3 is an exploded perspective view of the radial bearing shown in FIG. 2.

When the radial bearings 13, 14, 16, and 17 having the above construction are used in the transmission shown in FIG. 1, each radial bearing is subjected to a weight W acting in the vertical direction, namely in the direction of the minor axis of the ellipse, from a starting time to a time when the rated rotational speed is achieved. Thus, a fuel hole 10b is formed slightly under one of the divided ends 9 of the lower half bearing 3b so as to penetrate from an outside diameter to an inside diameter of the lower half bearing material 15b. In an inner circumferential side end of the fuel hole 10b, a fuel groove 11b axially extending except for both axial ends of the bearing is formed, as shown in FIG. 3 in detail. The fuel groove 11b is provided for uniformly supplying lubricating oil to a bearing sliding surface 12.

Also in the upper half bearing 3a, a fuel groove 10a is formed slightly above one of the divided surfaces 9. Further, a fuel hole 11a communicating with the fuel groove 10a is formed. Then, the upper half bearing 3a and the lower half bearing 3b are combined such that the sliding members 8 are differently positioned by 180 degrees with each other as shown in FIG. 3.

FIG. 3 shows the upper half bearing 3a and the lower half bearing 3b of the radial bearing in a divided form respectively, in a bird's-eye view. The sliding member 8 is lined on the inner circumferential surface of each of the upper and lower half bearings 3a and 3b, as described above. The thickness of the sliding member 8 in the radial direction is approximately 4 mm in case of the bearing which supports a rotating shaft having a diameter of approximately 100 to 200 mm. The sliding member 8 treatment is not performed over an angle ψ in the circumferential direction because of the reason described below. That is, the inner circumferential surfaces of the upper and lower half bearings 3a and 3b have steps, of which the upper portion (protruding portion) is formed by applying the sliding members 8, while bearing materials 15a, 15b are exposed on lower portion of the steps.

An angle over which the sliding member 8 is applied is θ+90 degrees, and it is found that θ of 20 to 30 degrees is desirable based on experimental researches of the inventors. Thus, it is also found that ψ of 60 to 70 degrees is desirable. The rotating shaft is adapted to rotate from a side on which the sliding member 8 is applied to a side on which it is not applied. In a transverse shaft apparatus in which the rotating shaft is horizontally placed, the upper half bearing 3a and the lower half bearing 3b are arranged so that the major axis of the ellipse is horizontal, and therefore the divided surfaces 9 are substantially horizontal.

Figure 4:
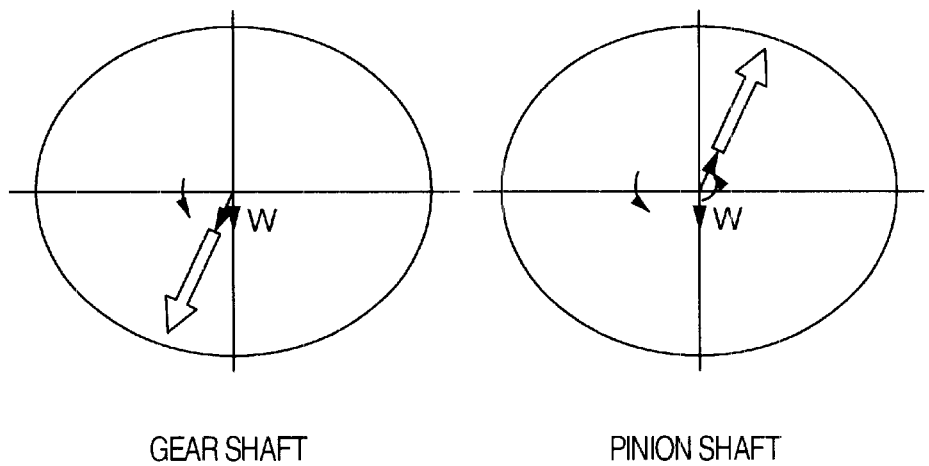
FIG. 4 is a view for explaining a pressure distribution of the bearing.

An operation of the radial bearing having the above construction will be described below. FIG. 4 shows states of load acting on the bearings in the case that the transmission is a reducer. In FIG. 4, the gear shaft exerts a download and the pinion shaft exerts an upload. A weight of each shaft is perpendicularly and downwardly applied to the radial bearings supporting the gear shaft and the pinion shaft, during a starting time to a time when the rated rotational speed is achieved. A bearing load in this case is approximately 0.1 MPa as an average specific load, which is a value of load divided by a product of diameter and width of the bearing.

When the speed reaches a rated rotational speed and a generator begins to output, the load direction of the radial bearing supporting the pinion shaft changes to a slanting upward direction of approximately 160 degrees forward from a perpendicular downward direction in the rotating direction. Magnitude of the load in this case becomes extremely large and is 3 MPa or more in an average specific load. On the other hand, at the rated rotational load, the load direction of the radial bearing supporting the gear shaft is opposite to that of the radial bearing supporting the pinion shaft, and is of approximately 20 degrees from the perpendicular downward direction in the counter-rotating direction.

Figure 5:
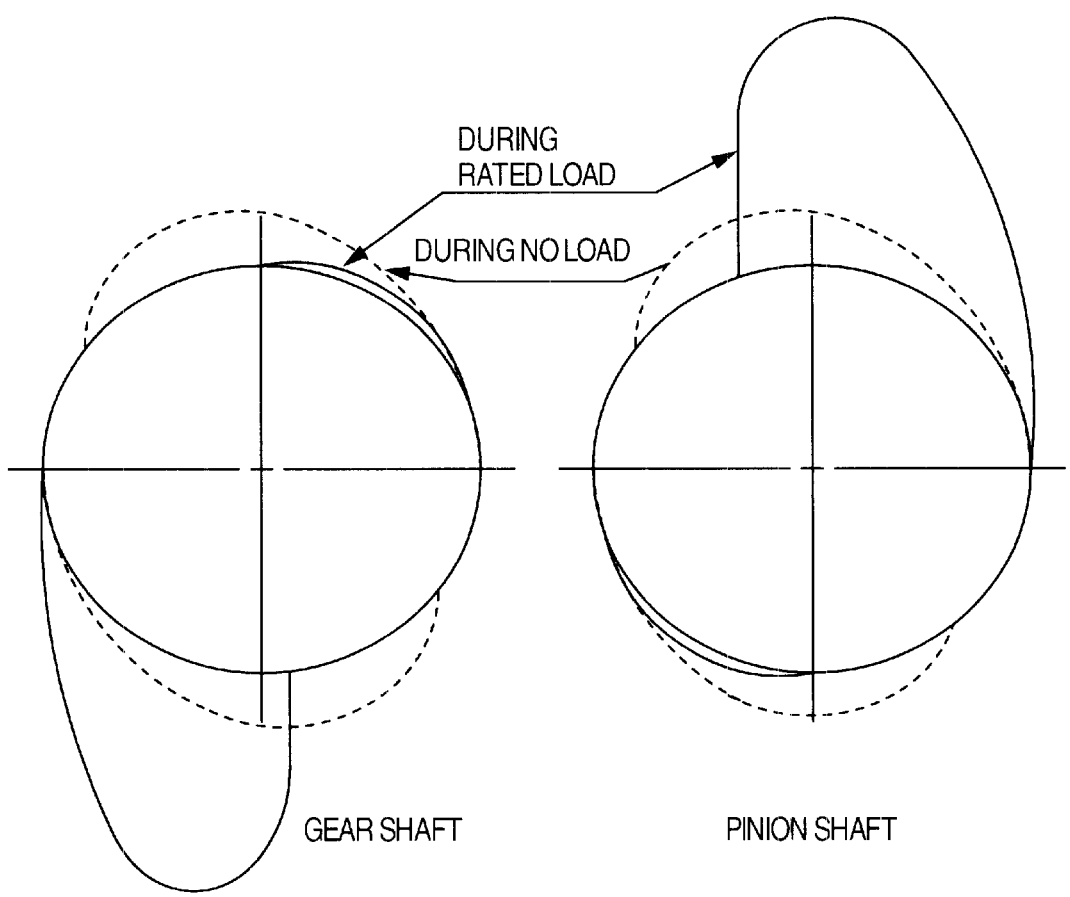
FIG. 5 is a view for explaining a shaft center position and the stability of a rotating shaft.
Figure 6:
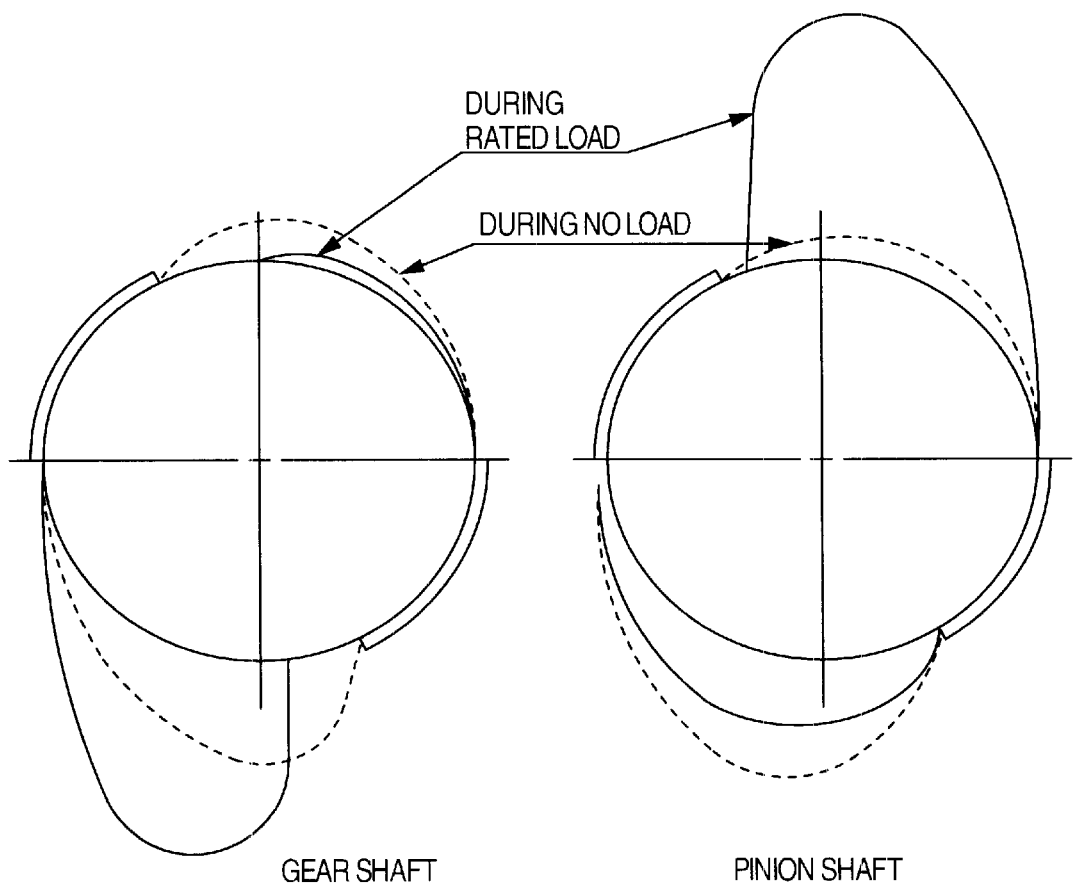
FIG. 6 is a view for explaining a pressure distribution of the radial bearing according to the present invention.

FIG. 5 shows a bearing property in the case that a conventional radial bearing is used in a reducer, and FIG. 6 shows a bearing property in the case that a radial bearing according to the present invention is used in the reducer. These drawings show distributions of dynamic pressures generated on sliding surfaces of the bearings. A dashed line indicates a result at no-load running from a starting time to a time when a rated rotational speed is achieved, in which the average surface pressure is approximately 0.1 MPa. A solid line indicates a result at load running when a rated load acts after the rated rotational speed is achieved, in which the average surface pressure is 3.0 MPa or more. In the radial bearing, the dynamic pressure is generated at a wedge-shaped position where an oil film between the rotating shaft and the bearing becomes narrower in the rotating direction. When the load is small, a value of the dynamic pressure is low and the dynamic pressure is generated over a wide area. On the contrary, as the load is increased, the generating area of the dynamic pressure narrows. In a normal surface pressure, the pressure generating area starts from the divided surface 9 and ends at a position of approximately 90+30 degrees from the divided surface 9 in the rotating direction. On the other hand, in the case of light load, the end point is a position of approximately 90+50 to 70 degrees from the divided surface 9 in the rotating direction.

In FIG. 6 in which a bearing having an reduced sliding area according to this embodiment is used, when normal load or high load acts after the rated running speed is achieved (solid line), a similar pressure distribution to that of the conventional cylindrical bearing shown in FIG. 5 appears. As a result, stability for the self-excited vibration is reserved. On the other hand, when the load acting on the radial bearing is light, the pressure distribution is that as shown by a dashed line. In this case, pressure is not generated in the portions where bearing sliding materials 12 are not lined, so that the pressure distribution pattern resembles to one at normal load as shown by the solid line. Therefore, reduction of the eccentricity of the rotating shaft can be prevented.

Although the self-excited vibration may occur because pressure is generated over a wide range at light load in conventional cylindrical bearings, in the bearing according to this embodiment, the stability for the self-excited vibration is not compromised even under a light load. Additionally, this embodiment employs an elliptic bearing, so that the pressure is also generated on the upper half bearing 3a. This further increases the stability for the self-excited vibration in comparison with a circle bearing.

Figure 7:
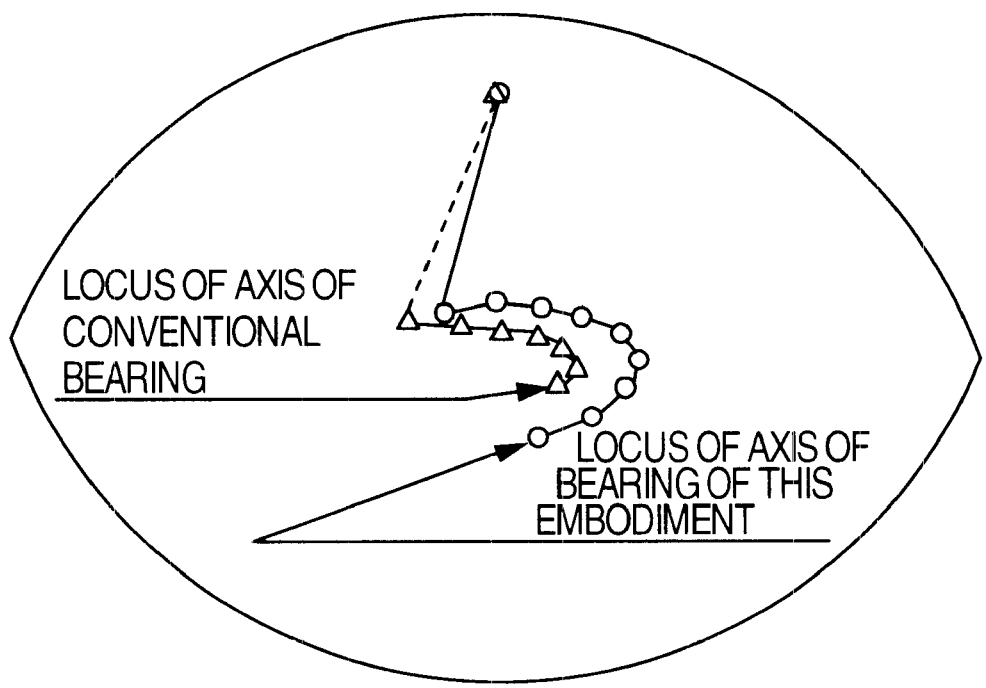
FIG. 7 is a view for explaining a bearing spring constant of the radial bearing according to the present invention.

FIG. 7 shows loci of shaft centers of the rotating shafts. A position of the shaft center depends on load acting on the bearing. Symbols ◯ are marked for a bearing according to the present invention, and symbols Δ are marked for a conventional bearing. Generally, the self-excited vibration such as oil whip is not generated if the eccentricity is 0.8 or more, which is the value of an eccentric amount from the bearing center of the rotating shaft divided by a radius clearance. Thus, the eccentricity is increased in order to stabilize shafting. By using an elliptic bearing, the upper half bearing 3a also generates a dynamic pressure to press the rotating shaft downwardly so that the eccentricity can be increased. Additionally, it is also contemplated that oil grooves are provided in the lower half bearing 3b so that the load capacity is reduced and the eccentricity is increased.

However, there is a limit to increase the eccentricity by using these ways. For example, in the way in which the rotating shaft is pressed, the oil film generates little pressure when the load is extremely reduced, so that the rotating shaft remains floating in which the eccentricity is reduced. On the other hand, in the way in which the groove is provided on the loaded surface, the eccentricity is unusually increased when the received load becomes excessive, so that the thickness of the oil film may be decreased to cause burnout of the bearing due to breaking of the oil film. Therefore, it is effective in increasing the eccentricity to use a radial bearing according to the present invention in which an area of the bearing is reduced.

Figure 8:
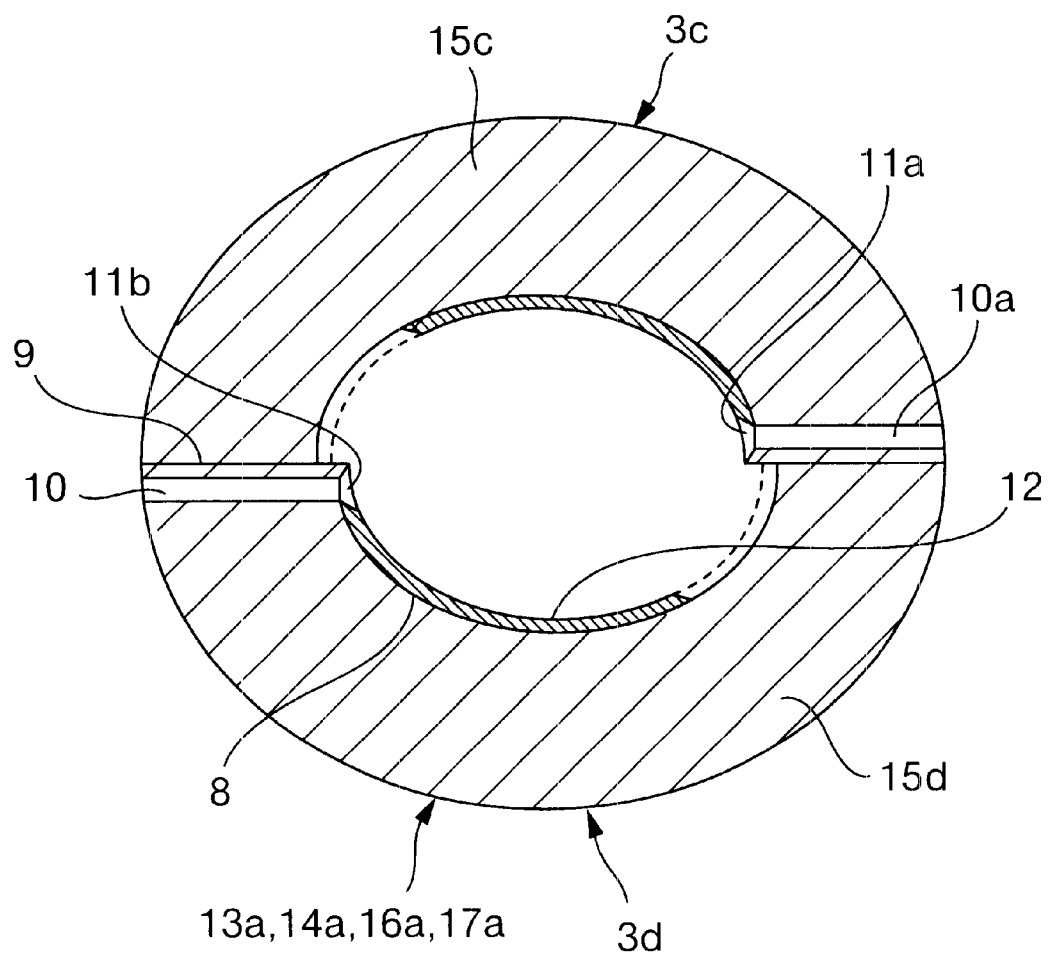
FIG. 8 is a longitudinal sectional view of another embodiment of the bearing used in the transmission shown in FIG. 1.

FIG. 8 shows a longitudinal sectional view of another embodiment of the radial bearing according to the present invention. This embodiment is different from the above-described embodiment in that connecting positions of the bearing materials 15c, 15d at the divided surface are offset in a direction of the major axis of the ellipse. The radial bearing 13a, 14a, 16a, or 17a for supporting load of the rotating shaft has two-part formed, upper and lower half bearings 3c and 3d. These bearings are fastened by a bolt not shown. On inner circumferential surfaces of the upper and lower half bearings 3c and 3d, resin materials 8 such as PEEK are partly lined. The upper half bearings 3c and lower half bearings 3d are horizontally offset at a divided surface 9 position. The offset direction is opposite to that of offset bearings generally used.

Figure 9:
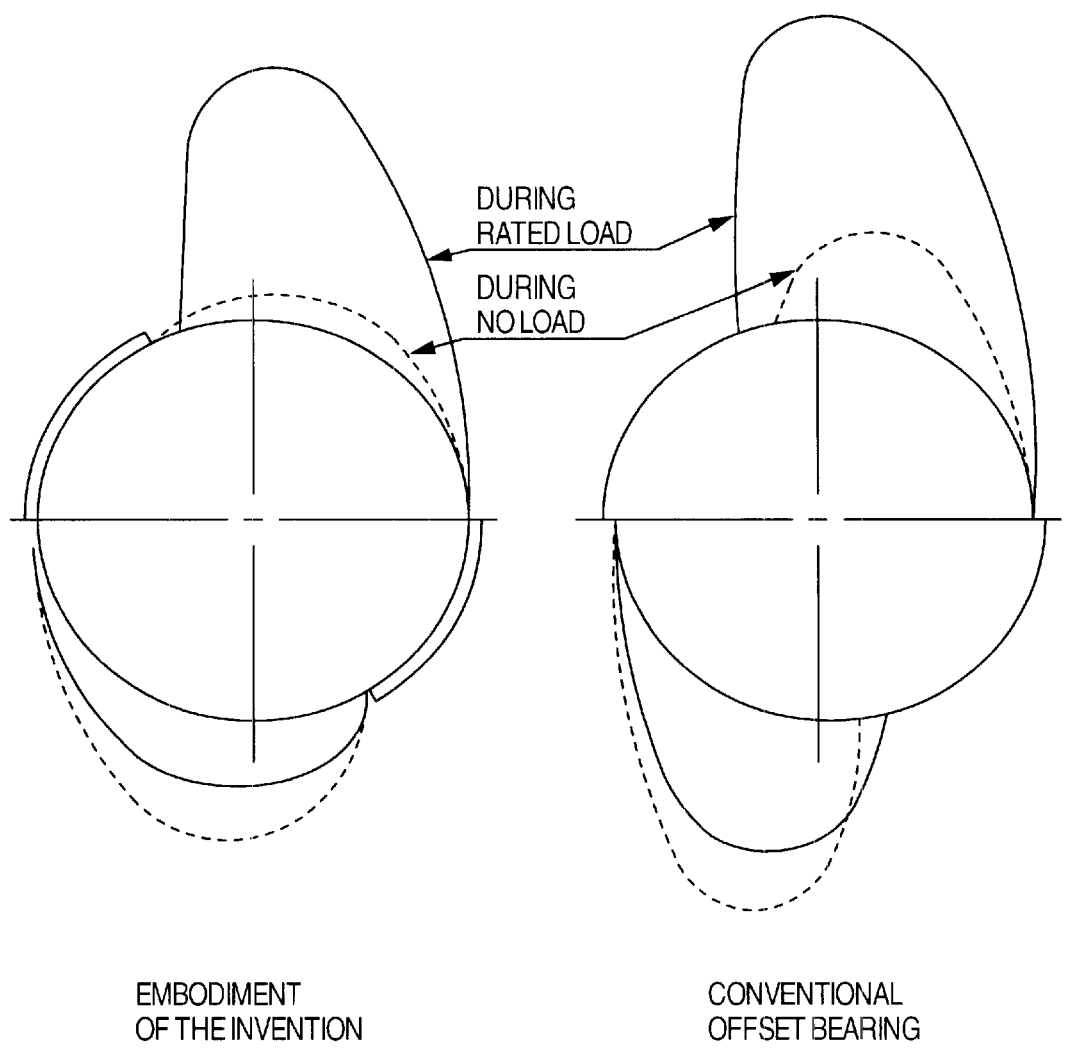
FIG. 9 is a view for explaining a pressure distribution of the radial bearing according to the present invention.

FIG. 9 shows pressure distributions of the oil film of the offset bearing, and the bearing according to the above-described embodiment, for the purpose of comparison. In this embodiment, the upper half bearing 3c and the lower half bearing 3d are horizontally offset so that a wedge-shaped film range of the upper half bearing 3c spreads to increase a generated pressure. As a result, a dynamic pressure generated on the upper half bearing 3c is larger than that in the above-described embodiment.

Figure 10:
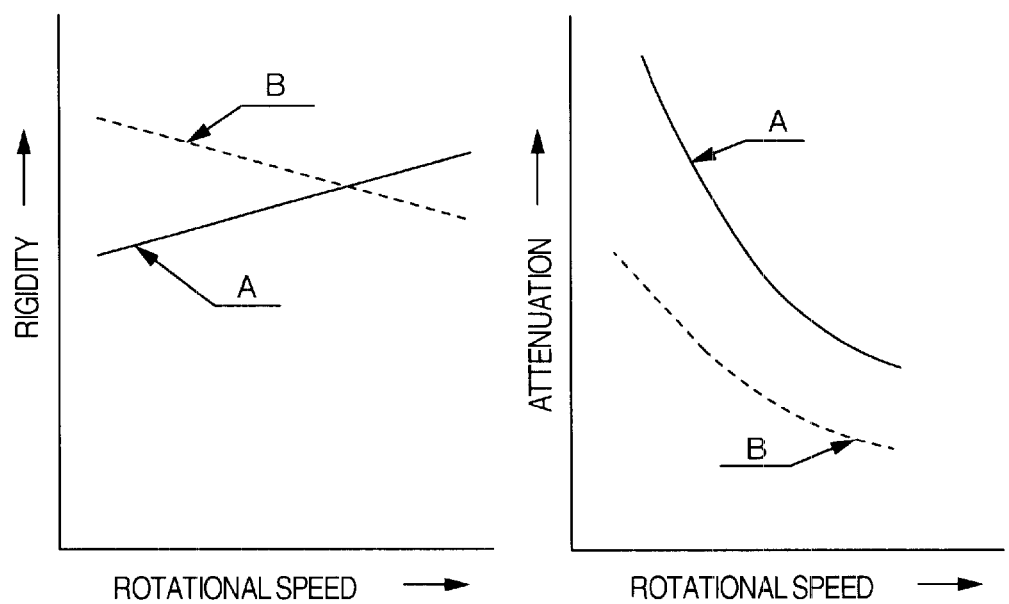
FIG. 10 is a view for explaining the performance of the bearing.

FIG. 10 shows changes in rigidity (spring constant) and attenuation coefficient of the radial bearing with respect to rotational speed. In the figure, a solid line "A" indicates the radial bearing according to the present invention, and a dashed line "B" indicates a cylindrical bearing conventionally used. According to the present invention as shown by the solid line "A", a horizontal spring constant is not much difference to that in case of the conventional cylindrical bearing. Additionally, as the rotational speed increases, the spring constant increases. On the other hand, the attenuation coefficient is significantly improved. Therefore, damping effect to unbalance vibration is obtained, in addition to the stability for the self-excited vibration.

As described above, according to the present invention, bearing sliding parts are partly formed in a radial elliptic bearing in which a sliding material is resin, so that a radial bearing which can stably support a rotating body under from low load to high load.

What is claimed is:

1. A radial bearing for supporting a rotating shaft, which has a substantial elliptical-cylinder-shaped inner circumferential surface, a cross sectional shape of the inner circumferential surface perpendicular to the axial direction being an ellipse having two focal points, comprising, at least two protruding portions extending in the axial direction on the inner circumferential surface of the bearing, wherein the protruding portions are symmetric with respect to the central axis of the bearing to stabilize the shafting and comprise lubricating resin members provided on the inner circumferential surface of the bearing, wherein the protruding portions are located only in an area between the major axis of the ellipse, and 110 to 120 degrees therefrom in one circumferential direction on the inner circumferential surface; and an oil groove provided on an inner surface of the resin members in the vicinity of the major axis of the ellipse so as to extend in the axial direction of the bearing in a portion of the bearing between but not including both axial ends of the bearing.

2. The radial bearing according to claim 1 wherein the resin members are made of one selected from the group consisting of polyetheretherketone (PEEK), tetrafluoroethylene resin, and polyimide resin.

3. A radial bearing for supporting a rotating shaft, which has a substantial elliptical-cylinder-shaped inner circumferential surface, a cross sectional share of the inner circumferential surface perpendicular to the axial direction being an ellipse having two focal points, comprising, at least two protruding portions extending in the axial direction on the inner circumferential surface of the bearing, wherein the protruding portions are symmetric with respect to the central axis of the bearing to stabilize the shafting and comprise lubricating resin members provided on the inner circumferential surface of the bearing, wherein the protruding portions are located only in an area between the major axis of the ellipse, and 110 to 120 degrees therefrom in one circumferential direction on the inner circumferential surface; and an oil groove provided on an inner surface of the resin members in the vicinity of the major axis of the ellipse so as to extend in the axial direction of the bearing in a portion of the bearing between but not including both axial ends of the bearing.

4. The radial bearing according to claim 3 wherein the resin members are made of one selected from the group consisting of polyetheretherketone (PEEK), tetrafluoroethylene resin, and polyimide resin.

* * * * *